(12) United States Patent
Lähteenmäki

(10) Patent No.: US 7,638,148 B2
(45) Date of Patent: Dec. 29, 2009

(54) DRINK COMPOSITION AND A METHOD FOR COMPOSING A DRINK

(75) Inventor: Pertti Lähteenmäki, Helsinki (FI)

(73) Assignee: Suomen Ravitsemusinstituutti Oy, Helsinki (FI)

( * ) Notice: Subject to any disclaimer, the term of this patent is extended or adjusted under 35 U.S.C. 154(b) by 147 days.

(21) Appl. No.: 10/516,477

(22) PCT Filed: Jun. 2, 2003

(86) PCT No.: PCT/FI03/00437

§ 371 (c)(1),
(2), (4) Date: Jul. 14, 2005

(87) PCT Pub. No.: WO03/101225

PCT Pub. Date: Dec. 11, 2003

(65) Prior Publication Data

US 2006/0134299 A1    Jun. 22, 2006

(30) Foreign Application Priority Data

May 31, 2002  (FI)  ................................. 20021031
May 31, 2002  (FI)  ................................. 20021034

(51) Int. Cl.
*A61K 36/87* (2006.01)

(52) U.S. Cl. ...................... 424/776; 424/770; 424/775; 514/23

(58) Field of Classification Search ........................ None
See application file for complete search history.

(56) References Cited

U.S. PATENT DOCUMENTS

| | | | |
|---|---|---|---|
| 4,698,360 A | 10/1987 | Masquelier | |
| 5,233,520 A | 8/1993 | Kretsch et al. | |
| 5,412,564 A | 5/1995 | Ecer | |
| 5,704,350 A | 1/1998 | Williams, III | |
| 5,972,985 A * | 10/1999 | Thomas et al. | 514/400 |
| 6,024,281 A | 2/2000 | Shepley | |
| 6,224,872 B1 | 5/2001 | Shibuya et al. | |

FOREIGN PATENT DOCUMENTS

| | | |
|---|---|---|
| DE | 196 11 827 | 8/1998 |
| DE | 199 37 079 | 8/2001 |
| EP | 0416667 | 3/1991 |
| JP | 11318402 | 11/1999 |
| WO | 99/61038 | 2/1999 |
| WO | 9961038 | 2/1999 |
| WO | WO 99/61038 | 12/1999 |
| WO | 00/41575 | 7/2000 |
| WO | 01/05253 | 1/2001 |
| WO | 0105253 | 1/2001 |

OTHER PUBLICATIONS

Wang Shiwen, et al., "The Effect of Pychogenol on the Microcirculation, Platelet Function and Ischemic Myocardium in Patients with Coronary Artery Diseases", Eur. Bull. Drug. Res. 7(2):19-25 (1999).
Fitzpatrick, D.F. et al., "Endothelium-Dependent Vascular Effects of Pycnogenol", J. Cardiovasc. Pharmacol. 32:509-515 (1998).
Arts, Ilja CW et al., "Catechin intake might explain the inverse relation between tea consumption and ischemic heart disease: The Zutphen Elderly Study", Am. J. Clin. Nutr. 74:227-232 (2001).
Dubelaar, M.-L. et al., "Acute Effect of L-Carnitine on Skeletal Muscle Force Tests in Dogs", Am. J. Physiol. 260:E189-E193 (1991).
Sacks, Thomas et al., "Oxygen Radicals Mediate Endothelial Cell Damage by Complement-Stimulated Granulocytes", J. Clin. Invest. 61:1161-1167 (1987).
Soop, M. et al., "Influence of Cartnitine Supplementation on Muscle Substrate and Carnitine Metabolism During Exercise", J. Appl. Physiol. 64:2394-2399 (1988).
Gorostiaga, E. M. et al., "Decrease in Respiratory Quotient During Exercise Following L-Carnitine Supplementation", Int. J. Sports Med. 10 (1989), pp. 169-174.
Blankson, H. et al., "Conjugated Linoleic Acid Reduces Body Fat Mass in Overweight and Obese Humans", Journal of Nutrition 130:2943-2948 (2000).
Kowalski, Robert, Predicate logic as a programming language. In Proceedings Of IFIP 74, Amsterdam: North Holland (1974), pp. 569-574.
de Kleer, J., "An Assumption-Based TMS", Journal of Artificial Intelligence. 28:127-162 (1986).
Dempster, A., Upper And Lower Probabilities Induced By Multivalued Mapping. Anneals Of Mathematical Statistics. 38:325-339 (1967).
Shafer, G., The Mathematical Theory Of Evidence. Chapter 2. Degrees of Belief, pp. 35-55; Chapter 3: Dempster's Rule of Combination, pp. 57; Chapter 5. The Weights of Evidence, pp. 88-113; Chapter 8. The Discernment of Evidence, pp. 172-195;Chapter 11. Statistical Evidence pp. 237-273; Princeton University Press (1976).
"Collection of Healthy Drinks", 7th edition, Feb. 2, 2002, "Shanghai News of Traditional Chinese Medicine" *Chinese Language Only*.
JP Office Action 2004-508594, May 2009.

* cited by examiner

*Primary Examiner*—Susan C Hoffman
(74) *Attorney, Agent, or Firm*—Volpe and Koenig, P.C.

(57) ABSTRACT

The present invention relates to a drink composition comprising active agents, and to a method for composing a drink. Specifically, the invention is directed to a drink composition to be used during long-lasting sports activities demanding constant energy supply and intensive concentration. The drink composition of the invention in characterized in that it contains glucose, fructose, guarana, and a physiologically active amount of a pycnogenol extract. The method of the invention in characterized in that the active agents are individually selected on the basis of the characteristics of the target group, single user and/or conditions of use, said active agents having at least partly complementing actions.

16 Claims, No Drawings

DRINK COMPOSITION AND A METHOD FOR COMPOSING A DRINK

The present invention relates to a drink composition comprising active agents, and to a method for composing a drink. Specifically, the invention is directed to a drink composition to be used during long-lasting sports activities demanding constant energy supply and intensive concentration.

Energy drinks for increasing blood sugar levels for instance during sports activities are commonly known. Caffeine or guarana extract and various sugars and other carbohydrates may be present as active agents. For instance DE 19937079 discloses an energy drink containing guarana extract and caffeine in addition to water and sugars. EP 416 667 (Procter & Gamble) discloses a drink comprising components of green tea, such as catnecin and/or epicathecin, and caffeine in addition to water and flavouring agents. The object of the invention of this document is to provide a drink composition having favourable effects of flavonols stable in liquid form.

According to this document, a method for combining known favourable effects of caffeine and components of green tea in a single drink stable in liquid form is thus known. During long-lasting sports activities demanding constant energy supply and intensive concentration such as golfing, shooting, bowling, or car racing, also simultaneous balancing of other aspects associated with mental and physical performance is needed. Moreover, recovery from the sports activity is important. Prior art suggests no single product covering all these areas.

Energy drinks in common use are meant for heavy physical performance. During long-lasting sports activities, conventional energy and refreshment drinks cause detrimental variation of blood sugar levels. In mentally sensitive sports competitions performed under stress such as as golfing, shooting, bowling, or car racing, variation of blood sugar levels is deleterious to muscle co-ordination and decreases performance and concentration.

The object of the present invention is to provide a drink composition containing active agents. The drink composition of the invention is characterized by features disclosed in the independent claim 1. The method for composing a drink composition is characterized by features disclosed in the independent claim 13.

As used hereinafter in the specification, and in the subsequent claims, the term "muscle function" is defined as including any of the following: muscular coordination, tension, tremor, relaxation, blood circulation, lactic acid accumulation, metabolism, energy production, utilization of fats, stress response, recovery after stress, soreness, strength, liquid balance, and convulsions.

As used hereinafter in the specification, and in the subsequent claims, the term "mind function" is defined as including any of the following: mental concentration, alertness, fatigue, memory, stress tolerance, glucose levels, levels of the neurotransmitters serotonin and/or acetylcholine, endorphin levels, levels of the neurorertide carnosin.

Since the drink composition of the invention is meant for consumption during long-lasting sports activities demanding intensive concentration to improve and maintain the mental and physical performance, according to the inventive sense is preferable to focus on more than just one aspect. One important aspect is the control and maintenance of blood sugar balance. In addition, other factors also contributing to the performance, such as relaxation during the activity, yet keeping the maintenance of the co-ordination ability and alertness in mind, should be taken into consideration. For instance, since golf as a sports event demands long-lasting performance requiring concentration, adequate and constant blood sugar balance should be maintained without the side-effects of conventional stimulating agents such as caffeine, for instance muscle tremor and tenseness. For said performances it is thus preferable to improve blood circulation and energy metabolism. Also the steady functioning of the nervous system is important for concentration and co-ordination abilities.

A an additional advantage of the drink composition of the invention, it allows for the standardization of the conditions for the user. Particularly in situations encountered in competitive sports, it is important to minimize the influence of external factors such as unusual nourishment in strange surroundings on the performance of the athlete. Examples of substances that may even originate from food having deleterious effects include glutamate or certain azo dyes that may hamper concentration or co-ordination. When using the drink composition of the invention as nourishment during the whole sports performace, the energy, and other substances received by the user may be kept at an optimal constant level. Thus, any harmful effects of strange food or other similar factors are thus minimized.

The method of the invention for composing a drink composition is based on the specific selection of the active agents according to the characteristics of the target group, individual user and/or conditions of use such as climatic conditions, or properties in such a manner that their actions are complementary due at least to partial co-operation with one another. Said co-operation may be synergistic, or opposite effects may result in a favourable net effect. Characteristics of the target group or single user may include one or more of the following: age, sex, general health, genetic background. Preferably, the active agents are selected to have a balancing effect on one or more of the following aspects: sugar balance, central nervous system, circulation and muscles. Preferably, said active agents also have a balancing effect on one or more of the following physiological aspects: intestine, digestion, joints, bones, cardiovascular system, skin, nails, hair, hormonal balance and immune system.

That is, the drink composition of the invention comprises a combination of agents mutually balancing and supporting the effects thereof. Thus, low concentrations of single agents result in a drink composition endowed with desirable favourable properties by the fact that the agents act together. Due to low concentrations of single agents, taste or similar problems are reduced compared with a case where a favourable effect is sought with a single ingredient possibly having an unpleasant taste. Moreover by using low amounts of various agents acting in a similar way, a synergy benefit or another advantage based on the co-operation may be attained, thus acquiring a stronger effect with a lower dose. This in important for instance in cases the user is prone to hypersensitive reactions by an ingredient. With the drink composition of the invention, the harmful variation of the blood sugar level may be avoided, and in addition, for instance excessive effects of adrenalin on the body may be alleviated.

Moreover, with the method of the invention, the drink composition may be tailored for various user groups according to several parameters, such as age, sex, general health, genetic background such as the structure and the operative state of the genes of the user, as well as the according to characteristics of the sport event in question. Based on the characteristic features of the user or user group, the amounts and proportions of different ingredients may be taken into consideration. The drink composition contains several active ingredients in physiologically effective amounts. For the purposes of the invention, the expression "physiologically effective amount" refers to an amount of a substance or substances having significance in the metabolism of the user. For many of the substances mentioned in this document, generally recommended applicable dosages and dose ranges are known. In addition, according to a preferable embodiment, a drink composition may be individually composed according to the characteristic features of the user or user group immediately prior to use based on the parameters produced by an automatic information system and device. For instance on the basis of the age of the user, a special factor such as protection of joints may be an issue for composing the drink. In drinks to be consumed in hot climate, it is possible to underline especially properties that contribute to the conservation of for instance the liquid and salt balance, or protection of the skin from the sun for instance by using carotenoids. On the other hand, it is possible to direct special attention to individuals sensitive for instance to salts. Or certain flavonoids may provide special protection in people who smoke.

The drink composition of the invention preferably contains both sugars, such as glucose, increasing rapidly the blood sugar level, and sugars having a sustained action, such as fructose, as well as taurin, guarana and a bark extract containing flavonoids, such as pycnogenol, tall bark extract or grapeseed extract, and possibly caffeine. As is known, caffeine has a rapid stimulating effect. To counterbalance this, the drink composition of the invention preferably contains guarana extract that yet contains minor amounts of caffeine, but, however, acts as a stimulant and a substance with generally a slower effect improving the concentration. Due to this fact, the caffeine concentration of the drink composition may be relatively low, thus reducing the harmful effects of caffeine such as tremor or hypertension in individuals sensitive to caffeine. A strong stimulating effect is however attained by means of said co-operation. Also taurin may be used in combination with other stimulating substances due to stimulating properties thereof.

A substantial feature of the invention is the controlled use of monosaccharides, fructose and glucose, for maintaining the blood sugar balance. By using monosaccharides, it is possible to avoid problems sometimes encountered when carbohydrates with longer chains are used that may be due to individual characteristics. Many people suffer from intestinal symptoms and other problems caused by the long chain carbohydrates of the maltodextrin type popular in sports drinks. These problems may be avoided by using monosaccharides, since the metabolism of a single subunit carbohydrate is simpler and better predictable than that of a long chain polysaccharide or polysaccharides possibly containing chains of varying lengths and types. By using fructose and glucose, fructose being a monosaccharide metabolizing considerably slower than glucose and having a lower glycemic index (the glycemic index of fructose is 20, whereas that of glucose is 100), in certain proportions, optimal blood sugar levels remaining constant for long periods of time may be attained without several harmful side-effects. Thus, brain is immediately supplied with necessary glucose, the effect of fructose being balancing. This contributes to the maintenance of the mental performance. Fructose content is preferably higher than that of glucose. Balanced sugar metabolism, which may be additionally promoted with soluble chromium, is thus reached for long periods of time. In this manner, it is possible to avoid sudden changes in blood sugar levels that may be harmful for concentration and co-ordination in certain sports events. The ratio of fructose to glucose may for instance be in the range of 2:1-8:1, preferably 2:1-6.1.

According to a preferable embodiment, an optimal ratio of fructose to glucose is about 4:1. However, for instance in the selection of this ratio according to the method described above, individual features of the user or user group such as different sugar metabolism levels or different insulin response due to genetic background may be taken into consideration.

Flavonoids refer to phenolic compounds of plant origin belonging to phytochemicals, commonly found in plants as dyes. They typically have the same basic structure, but they may be divided into subclasses, i.e. flavonols, flavones, flavanones, and flavanols. Based on studies, flavonoids act as antioxidants, prevent cancer and inflammation, lower cholesterol levels and protect the cardiovascular system. Most common sources of flavonoids are vegetables, fruit, berries, tea and red wine.

The drink composition contains flavonoids that, in addition to their antioxidant properties, balance the function of the muscles and mind, thus acting as relaxants and agents that counterbalance the effects of adrenalin. Such flavonoids are present in extracts from bark of a conifer, for instance a coastal pine (*Pinus maritima*), said extract containing proantocyanidins (compounds belonging to pycnogenols) described in U.S. Pat. No. 4,698,360, known with the trade name Pycnogenol®. Also green tea extract is rich with flavonoids. Bark extracts containing other flavonoids useful in the invention include extracts from the Finnish pine (*Pinus sylvestris*), or grapeseed extracts, both said extracts having very similar effects and containing similar active agents such as oligomeric proantocyanidins (OPC), cathecins and polyphenols. Products corresponding to Pycnogenol® are commercially available for instance under the trade name MASQUELIER's®, these products being extracted from pine bark and grapeseeds by the inventor of original pycnogenols. In the comparisons performed (ESA Coulometric Array Detection. PhytoChem Technologies, Chelmsford, Mass. 01824-417), the antioxidative properties of said products are shown to be very high.

The antioxidative effect of extracts from the Finnish pine has been compared to that of green tea and Pycnogenol® extract (CRS Biotech, Oulu, Finland, 2000), thus showing that an amount of 40 mg of pine bark extract as an inhibitor of hydroxyl radicals was about 1.5 times more efficient than a corresponding amount (1 tablet) of Pycnogenol®, more than 10 times more efficient than a portion of green tea, and 5 times more efficient than a daily dose (60 mg) of vitamin C.

The expression "bark extract containing flavonoids" used herein means any mixture isolated from plant peels, shells, barks or seeds containing flavonoids and other functional ingredients. Preferably, said bark extract is isolated from a conifer bark. More preferably, said bark extract containing flavonoids is isolated from pine (*Pinus*) bark. Although in the following, the properties of the drink composition of the invention are described by using a pycnogenol extract as an example, it should be appreciated that any bark extracts or seed extracts containing other equivalent flavonoids may be used instead of or in addition to it.

The positive effects of these flavonoids on muscles may be intensified and complemented with magnesium and potassium to improve the sustained performance thereof. In combination with flavonoids, magnesium has effects reducing stress reactions.

For the drink composition of the invention, it was found that pine bark extract, such as pycnogenol extract containing flavonoids in combination with other active agents has surprisingly favourable effects during performances described above. In this connection, the term "pycnogenol" means a pycnogenol preparation containing various ingredients, preferably an extract such as the product of the Horphag Company sold under the trade name Pycnogenol®. Pycnogenol is for instance a strong natural antioxidant found to increase the production of nitrogen oxide in the endothelial cells of vascular inner walls (Wang S. et al. (1999) Eur. Bull. Drug. Res 7(2):19-25). Nitrogen oxide acts like a hormone to maintain the circulation, binding to receptors in the muscles that surround arteries, thus causing the relaxation of said muscles (Fizpatrick D. F. et al (1998), J. Cardiovasc. Pharmacol. 32: 509-515). This results in the increase of the diameter of the vessels, and thus in intensified circulation. This may be one of the reasons for favourable effects of pycnogenol in an embodiment of the drink composition of the invention. Moreover, the increased production of nitrogen oxide prevents the platelets from aggregating, thus further improving the circulation. Another property of pycnogenol is the ability to prevent muscular convulsions owing to phenolic acids it contains, a fact that is further beneficial in performances described above. Pycnogenol also counterbalances the influence of adrenalin. One mechanism against stress based on pycnogenol is the ability thereof to prevent neuronal damage caused by glutamate. Glutamate may for instance cause excessive excitement in the body. The glutamate found in the body may be of endogenous or exogenous origin.

A preferable embodiment of the drink composition of the invention comprises green tea extract. Green tea not only contains antioxidants protecting cells, but it also has relaxing effect that improves concentration. The flavonoids of green tea, particularly epigallocathecin gallates protect the cardiovascular system. (Am. J. Clin. Nutr. 2001; 74: 227-232). Cathecin of green tea counteracts high blood pressure like a hypotensive drug by inhibiting the formation of angiotensin II. Also the gamma-aminobutyric acid (GABA) lowers increased blood pressure. The ability of green tea to lower blood sugar levels is particularly beneficial for diabetics.

Further, in a preferable embodiment of the drink composition of the invention, the L-carnitine used therein is found to have favourable effects on performances described above. Only racemically substantially pure L-carnitine may be used, since D-carnitine or the racemic mixture of L- and D-carnitines has deleterious effects on health. In this connection, "carnitine" means only and specifically L-carnitine. L-carnitine in endowed with several positive effects directed not only on energy metabolism, but also on cardiovascular system, circulation, muscular and nervous systems. For instance in circulation, L-carnitine improves the function of erythrocytes, dilates blood vessels, lowers the viscosity of the blood, thus intensifying the circulation. In sports events, L-carnitine has a favourable effect on sugar metabolism, it decreases the time needed for recovery and lowers stress (and the secretion of stress hormones) and heart rate. One of the effects of carnitine, namely the ability to improve the circulation in muscles, may be a contribution to quicker recovery and less sore muscles (Dubelaar, M.-L. et al., (1991), Am. J. Physiol. 260:E189). It also acts against the lowering of blood sugar levels, and suppresses sensation of hunger. Further, the ability of carnitine to alleviate tiredness and mental fatigue, and the positive influence thereof on the endorphin effect during sports activities is known. L-carnitine protects neurons against neurotoxic ammonia that may cause tiredness. Besides heart, abdomen contains the highest amounts of carnitine in the body, and thus carnitine is very important for these organs since both of them are constantly active. Abdominal respiration is very important, particularly in sports for relaxed sportive performances. L-carnitine also reduces the accumulation of lactic acid in muscles (Sacks, T et al., (1987), J. Clin. Invest. 61:1161, Soop, M. et al. (1988) J. Appl. Physiol. 64: 2394) thus saving glycogens of the body (Gorostiaga, E. M. et al., (1990) Biochim. Biophys. Acta 1034:17).

One of the favourable properties of L-carnitine is its important role in the metabolism of fatty substances. With L-carnitine, it is possible to help the body to balance its energy production by increasing the utilization of fats to give energy. Thus the muscles get the energy they need from fats, and glucose contained in the drink composition of the invention directly acts as the energy source of the brain.

The effects of L-carnitine and pycnogenol extract are partly similar, and they are shown to complement each other in the use according to the invention. The connection between vitamin C, and carnitine may be mentioned as a further example. It is known that pycnogenols act synergistically with vitamin C. Vitamin C deficiency is generally the reason for the carnitine deficit in the body. Pycnogenols thus have a favourable effect on the metabolism of carnitins in the body. It is known that besides the minerals and trace elements mentioned, also magnesium is known to maintain the ionic balance of the body and to intensify the effects of other substances, such as those of L-carnitine and pycnogenol. An effect counteracting stress and relaxing muscles is known for magnesium. On the other hand, lack of magnesium increases muscular tenseness and may lead to high blood pressure or stress overreaction. It has been found that chromium has favourable effects on the sugar and fatty metabolism in humans, and it improves the therapeutic index in diabetics and cures cardiovascular diseases. Lack of chromium may induce reduced glucose tolerance.

The drink composition may further contain an effective amount of one or more of the following substances or substance groups: carbohydrates, salts, flavonoids, isoflavonoids, such as phormononetin; lignans, betain, methylsulphonyl methane (MSM); minerals and trace elements; proteins, peptides including carnosine; amino acids including tryptophan or taurin; mucopolysaccharides including chondroitin sulphate; glycosamino glycans, *curcuma*, alpha-lipoic acid, antibodies, colostrum preparations, probiotics, prebiotics; herbs or ingredients therefrom, including *Ginkgo biloba, Passiflora incarnata, Carduus marianum*, hop, oat seedlings, and lemon balm; essential oils including anise, nutmeg and cinnamon; adaptogenic plant extracts including *Rhodiola rosea*, ginseng, *Acanthopanax senticosus*, and *Leuzea carthamoides*; vitamins including vitamin C and vitamins of the B-group, fat-soluble vitamins, ubiquinone and inositole; choline, carotenoids, garlic preparation, secoiridoid, soluble fiber, fatty acid, conjugated linoleic acid, phospholipid.

Further, the drink composition of the invention may contain drugs in physiologically active amounts, for instance for hypertension, asthma, allergies or drugs for the well-being of the skin.

Also the sex may be taken into consideration in designing or preparing the drink composition. For instance for women in menopause, certain isoflavonoids, such as phormononetins of clover including biocain A, or cumestan, or lignans may be incorporated into the composition, these substances being plant estrogens influencing in many ways hormonal metabolism and preventing cancer.

Conjugated linoleic acid (CLA) is a fatty acid found naturally in milk products and meat, having several favourable functional effects. It is found to be an effective anabolic agent for weight reduction, burning of fat, and for strengthening and compacting the muscles (Blankson, H et al (2001) Journal of Nutrition. (2000) 130: 2943-2948). It prevents fats from accumulating into cells and promotes the lipolysis thereof and the beta-oxidation of fatty acids. Moreover, it prevents cancer, and cardiovascular diseases. In some human studies, the consumption of CLA as an additional nutrient has normalized disorders of glucose tolerance in type 2 diabetes. In the drink composition and the method of the invention, CLA may be used particularly in drink types for diabetics.

Inositol is a vitamin-like substance necessary for correct functioning of serotonin and acetylcholine brain transmitters. Moreover, it plays a role in fatty metabolism. Choline acts with inositol mutually intensifying the effects thereof. Both of them are components of lecithin. Choline has favourable effects e.g. on memory.

Alpha-lipoic acid (thioctic acid) is a vitamin-like substance known for its ability to reduce blood sugar levels. This does not however act like insulin, but it accelerates the conversion of carbohydrates to energy. Alpha-lipoic acid as well as its metabolic product dihydrolipoic acid also act as an antioxidant.

With essential oils, it is possible for instance relax convulsions. Being slighlty sedative, herbs have balancing effects on the mental performance. For instance improved absorption of nutrients and promotion of intestinal activity are achieved with prebiotics such as fructo-oligosaccharides and probiotics, like lactic acid bacteria. By improving the absorption of nutrients, the necessary dose of a single agent is obtained with a lower concentration in the composition. Methylsulphonyl methyl (MSM) reduces articular and muscular soreness, and promotes relaxation of muscles. Moreover, it has an effect on the intestinal metabolism. Carnitin improves concentration and recovery of the muscles from exercise. Betain maintains the liquid balance in muscles, and it further balances and protects the functioning of the liver. Also for instance flavonoids and MSM have an influence on the latter. Chondroitin sulphate, glucosamino glycans and *curcuma* for instance protect joints. The seeds of Carduus marianum contain flavonolignans such as silymarin acting as antioxidants and particularly, protecting and promoting the functioning of the liver. Also seeds from several plants such as grapeseeds and the extracts therefrom contain antimicrobially acting agents, thus giving protection against microbes such bacteria and moulds and further acting as conserving agents. Also garlic contains such antimicrobially acting agents. Secoiridoids from oil palm, such as oleuropein belonging to terpens, are effective antiviral agents. In animal tests, they are shown to have a lowering effect on blood pressure.

Adaptogenic plants contain ingredients that help to improve mental and physical performance. Such plants include *Rhodiola rosea*, ginseng, *Acanthopanax senticosus*, and *Leuzea carthamoides*.

Moreover, for instance suitable antibodies or colostrum preparations may be incorporated into the drink composition according to the application thereof. Colostrum, i.e. foremilk from a cow after the birth of a calf, is rich in various bioactive compounds such as antibodies, growth factors, hormones, other proteins, and antiobiotically active factors. Colostrum and the products processed therefrom, including whey preparations from colostrum, are shown to promote the recovery of the body after exercise.

Colostrum products and probiotics such as lactic acid bacteria preferably co-operating to maintain the function of the digestive tract may be utilized for instance in situations where athletes travel to a place having a different food culture. It is very important to be able to protect the digestive tract from the stress caused by a totally different food in comparison to the conventional nourishment the athlete is used to, and to maintain the intact function of the intestine. Also soluble fibers such as pectin, inulin or guar gum have e favourable influence of the function of the intestine since they bind bile acids in the intestine and contribute to the removal of cholesterol from the body. They also prevent blood sugar levels from getting higher.

Proteins such as proteins from said colostrum or plant proteins have several positive effects in the body. They may act as construction materials thereof, as enzymes, antibodies, hormones or hormone-like molecules, growth factors, and further, they also have a central role in most of the biochemicals reactions taking place in the body and in the control thereof. Also fractions of proteins such as peptides may be important, for instance the bioactive peptides of milk lower blood pressure by acting on the so-called ACE enzyme. Soybean protein and fragmented soybean protein have several favourable effects on health; they for instance lower blood cholesterol and triglyceride levels, and prevent osteoporosis and inflammation. Carnosin is a dipeptide of two amino acids, alanin and histidin, β-alanyl-L-histidin. It acts as a buffer for lactic acid in muscles, strengthens and protects heart and other muscles, prevents diabetes and complications thereof, glaucoma, renal diseases and several diseases and disorders caused by ageing. In addition, it is a neuropeptide protecting brain cells. Carnosin co-operates in the body for instance with antioxidants, preventing the consumption and intensifying the function thereof.

Structural components of proteins, amino acids, may alone have several activities. For instance the amino acid tryptophan alleviates depression and promotes the function of thyroid gland. Arginin lowers blood pressure, and like leucin, has an effect on the secretion of insulin. The amino acid taurin has stimulating activity similar to caffeine and guarana.

It has been found that various fatty acids and phospholipids have properties especially improving the well-being of the brain. For instance phosphatidyl serine, one of the phospholipids found in cellular membranes, has an influence on the memory of aging individuals, and further improves concentration. Long-chain omega-3-fatty acids composed of alpha-linolenic acid such as EPA and DHA improve the stress tolerance of the brain and promote circulation.

The drink composition of the invention may be in the form of a dry substance including powders, granules or effervescent tablets, or it may be a ready-to-use liquid drink or drink concentrate. Concentrations indicated refer to the ready-to-use drink. Particularly useful liquid bases for the drink composition comprise for instance lingonberry and apple extracts having favourable properties as such, since they contain for instance flavonoids. Moreover, they have a pleasant taste, and particularly lingonberry extract gives the drink a pleasant colour. Also other liquid bases from berries or fruit preferably rich in antioxidants and/or flavonoids such as sallow thorn or cranberry are useful. In addition to its colour, juice of aronia has a property to lower blood pressure. Preferably some natural herbal preservative such as from oregano, sage, or rosemary is used in the liquid drink composition. Said herbal preservatives also act as active agents. However, any preservative familiar to those skilled in the art may be used.

According to one preferable embodiment of the invention, the drink composition is in the form of an ice cube. In this case, the composition is already mixed with the liquid base and freezed, thus facilitating the administration and improving the storage stability. Drink compositions in the form of an ice cube may for instance be added to other drink liquids for consumption.

The method of the invention for producing a drink composition may be carried out for instance with an automatic nutrition device. The method of the invention for producing a drink composition with an automatic nutrition device is characterized in that at least information about the user is entered to said automatic nutrition device, optimal nutrient and/or drug dose, the ingredients. i.e. active agents contained therein, and the amounts of said ingredients and proportions thereof are at least partly determined for the consumer of the dose by a data base arrangement, and the determined active agents are dispensed.

Said nutrients and/or drugs may for instance be semiprocessed products, final processed products, substanced produced synthetically, or combinations thereof, such as blackberry, compressed blackberry, blackberry juice, antocyan isolated from blackberry, synthetically produced antocyan, or a combination thereof. The substances contained in the automatic nutrition device may be in the form of liquids, concentrates, or powders, emulsions, tablets, effervescent tablets, capsules, pills, granules, or ice cubes, preferably in a form readily miscible with liquids. Said nutrients and/or drugs preferably are active agents mentioned above.

The operation of said automatic nutrition device is substantially based on the utilization of an information system and a data base arrangement thereof. With this information system, data from genetic characteristics and possible diseases of the user, environmental conditions and/or food intake by the user may be analyzed in relation to data obtained from medical and biological studies for the identification of optimal nutrition for the user. With this information system, it is possible to determine suitable nutrients and/or drugs for producing an optimal individual nutrient and/or drug dose for the user by at least partly utilizing neuronal fuzzy systems and methods that may learn.

In addition to said information, the data base arrangement of this information system may also contain reference data, data from scientific studies, and information about the user such as information about the age, sex, weight, height, genetic background and body construction, genome (DNA), operative state of the genes, race, population, nationality, diseases, allergies, mental state, medication, living and working environments, quality of employment, family relationships, individual history, and work or sports performances. Information about the user may also comprise data or values reflecting the body fat percentage, blood pressure, blood sugar level, hemoglobin and/or cholesterol levels. The data is preferably in the form processed in data base arrangement, such as probabilities indicating that a nutrient and/or drug may induce or protects against a disease with a given probability when consumed in certain doses.

Preferably, the information about the user should be adequate data illustrating the genetics, activity of the genes and/or physiological properties of the user, allowing the determination of the basic nutritional and medical needs for the user. Moreover, using said data, it is possible to direct attention to and determine any limitations due to diseases for the production method of the drink composition for the user, or to prepare, design or provide the medication for the user. Said information may also contain data about disorders in skeletal and locomotor system, depression, cardiac disorders, hypertension, allergy, asthma, headache, migraine, diseases of mind, diseases due to alcohol abuse, dementia and hormone-dependent cancer.

Particularly, the data base arrangement used in the method may comprise at least one probability weight coefficient for the fact that at least one gene acts on at least one health characteristics with a certain probability, and at least one active agent acts therapeutically or deleteriously on at least one health characteristics with a certain probability. Moreover, the data base arrangement may comprise at least one probability weight coefficient for the fact that at least one gene acts on at least one health characteristics with a certain probability, and at least one probability weight coefficient for the fact that at least one active agent acts therapeutically or deleteriously on at least one health characteristics with a certain probability. Further, the data base arrangement may comprise at least one probability weight coefficient for the fact that at least one gene together with at least one active agent acts therapeutically or deleteriously on at least one health characteristics with a certain probability, and at least one probability weight coefficient for the fact that the user has allergy against at least one active agent with a certain probability. In addition, the data base arrangement may comprise information about the optimal proportions between at least two active agents, and individual administration limits for at least one active agent.

Further, the data base arrangement may provide the automatic nutrition device with a signal indicating that the cumulative amount of the active agent in a predetermined period of time is higher or lower than the administration limit determined for the user of said active agent, and accordingly, the automatic nutrition device may decrease or increase the amount of the active agent to be added into that particular dose. Further, the data base arrangement may compare at least one gene from the gene map of the user to the gene maps of the data base arrangement, and choose a probability weight coefficient between said gene present in the gene map of the user and in the data base arrangement, and at least one health characteristics, on which said gene acts, as well as choose a probability weight coefficient between said health characteristics, and at least on active agent acting on said health characteristics either therapeutically or detrimentally with a certain probability, and it may provide information reflecting the suitability of the active agent for the user by means of said probability weight coefficients. Particularly, the system may arrange the active agents acting on said health characteristics either therapeutically or detrimentally with a certain probability, wherein probabilities associated with said active agents are utilized to provide information reflecting the suitability of the active agent for the user, in such an order that the active agent acting therapeutically with the highest probability on said health characteristics is set as the most important one.

Moreover, the information about the user may comprise data reflecting preferences and disapprovals of the user, as well as data illustrating hobbies and energy consumption at work and during leisure time. Data concerning preferences may be information about flavour and/or aroma preferences of the user, thus allowing the addition of a suitable flavoring/aroma agents preferred by the user to the nutritive dose. An optimal drink composition for the user may be composed with an information arrangement, taking data from a reference group and the user into consideration. A reference group may be e.g. athletes such as swimmers, car race drivers, bowlers, shooters or golf players.

Information concerning a certain reference group may comprise information for instance about eating habits, the type of nutrients and/or drugs and/or noxious substances typically got from the food consumed, living surroundings and/or working environment, genetic background, and diseases commonly found in this particular reference group. Such reference group may consist of population groups, races, and nationalities, for instance PIMA indians, Japanese, Eskimos, Finns, Finns from eastern Finland, Germans from eastern/western Germany, Slavonics, and Australians. Alternatively, said reference group may consist of people having the same profession, such as white collar workers, fire fighters, timbermen, divers, or athletes representing a certain sports event. Information about the user may be obtained from the user himself, or from the attending medical authorities. The user may himself provide the information arrangement with the information about himself, concerning for instance food preferences and disapprovals, diseases, energy consumption, working environment, hobbies and family relationships. The information provided by the user may, however, be any information provided in numerical form, by means of a code or a form, such as a paper form or an electronic form, or alternatively as a text in free form. Preferably, an electronic form is a HTML, XML and/or XML derived form available on the Internet.

The user may provide the information system with the needed information by means of the Internet, E-mail, digital television and cellular and mobile phones, as a letter or telefax, or by telephone.

Determination of the active agents suitable for the user may be carried out by at least partly analysing the amount and quality of the nutrients consumed earlier by the user, and other data needed to compose an individually optimized nutritive dose. Data concerning the nutrients consumed earlier by the user may comprise data from one or several day(s), such as a week or a month. Data concerning the active agents ingested by the user may be in a non-processed form or in an already processed form, for instance in a data base arrangement, provided by the information system of nutritive device to be used the method of the invention.

To determine the doses of the active agents with an optimum effect for the user, general health of the user may be analyzed for instance by means of data from a data base arrangement concerning the general health of the user, provided by the information system of nutritive device to be used the method of the invention. In addition, the genome of the user, that is the genetic information concerning the user, or at least part of the gene map of the user may be taken into account, said genetic information being saved in the gene map data base of the data base system provided by the information system of nutritive device to be used the method of the invention, or saved at least partly in the terminal used by the user, such as a mobile phone. Further, at least relevant parts of the data from scientific research may be taken into consideration. Such scientific data may be saved in a data base arrangement provided by the information system of nutritive device to be used the method of the invention.

In a data base arrangement to be used in the method of the invention, data may preferably be saved in a processed, predetermined form. For instance data concerning hereditary disposition may be entered to and saved in the data base arrangement according to the genetic test results for individuals, preferably as facts in a processed form indicating genetic forms causing liability to diseases. The genetic test results may for instance be presented as a succession of symbols "<genetic form/-dot>+<result>", the result being either positive or negative or possibly a weighted value, for instance a numerical value from −100 to +100 describing the weighted value of a gene, or a role in connection of a disease.

Alternatively, the facts may be directly presented in a form of a probability for said gene or genotype to cause liability to a disease, for instance the fact that people with the methylenetetrahydro folate reductase (MTHFR) genotype, a genetic modification causing high homocystein levels, acquire cardiovascular diseases with a risk that is 16% higher than that among people without such a genetic modification. In the data base arrangement, a cross reference may be made from the MTHFR genotype for instance to the folate level, since there is scientific evidence showing that the risk to acquire cardiovascular diseases is particularly high among individuals with a low folate level, and thus the probability to acquire a cardiovascular disease may be emphasized with a certain weight coefficient in case the folate level of the user is below the recommended received folate dose. For instance, if the folate level is below 20%, the weight coefficient may then be 1.8, weighing the probability (in this case, 16%) to acquire a cardiovascular disease, and accordingly, said probability may become as high as 29% (1.8×16%=29%). Weighing may also be performed with other mathematical procedures than multiplication.

Moreover, in the data base arrangement of the type described, there may be a cross reference to active agents, such as nutrients and/or drugs allowing the correction of a deficiency due to nourishment, for instance the increase of said folate level. In this case, said nutrient and/or drug may be suggested by the information system of the invention for the user, for instance to raise said folate level, and to lower the risk to get a cardiovascular disease. It is now generally accepted that increasing the folate level for instance by means of a diet is beneficial among people with the MTHFR genotype.

Said facts may also be presented in any other convenient way.

Information in the data base arrangement may for instance be presented in the form of a rule (so-called Horn clauses complemented with probability values, see R. Kowalski, Predicate logic as a programming language. In Proceedings of IFIP 74, pages 569-574, Amsterdam, 1974, North Holland). The deduction mechanism needed to compose a suitable nutrient and/or drug dose may be performed for instance with the Horn clauses complemented with probability values. The deduction mechanism may be performed for instance using deduction on the basis of assumptional values (e.g. J. de Kleer. An assumption-based TMS. Journal of Artificial Intelligence. 28. 127-162. 1986), and mathemetical basis thereof (e.g. A. Dempster. Upper and lower probabilities induced by multivalued mapping. Anneals of Mathematical Statistics. 38.325-339. 1967. G. Shafer. The Mathematical Theory of Evidence. Princeton University Press. 1976). Alternatively, said deduction mechanism may also be carried out in any other convenient way. One preferable embodiment of the drink composition of the invention is now presented. This non-limiting example describes a preferable alternative composition suitable for instance for golf players, and a formulation for making two different drink compositions.

Liquid drink composition was made by first boiling water I in a steam kettle. Water II was boiled in a kettle having a cover, and then cooled. Boiling water I was added with fructose and glucose while mixing. The sugars having dissolved, preservatives were added and mixed with juice concentrates. Guarana, taurin, Pycnogenol®, caffeine, green tea extract, L-carnitine, inositol, KCl and NaCl were mixed together and dissolved in cooled water II. These dissolved ingredients were added to the preparation cooled below 50° C. (water I, measured temperature 45° C.). Trimagnesium citrate was gradually added to the preparation to avoid effervescence, and the mixture was mixed for 4 hours.

Portion of the preparation was mixed with Ginkogamax, Relaxor and Avenamax tinctures, and with Dynaforce extract from *Rhodiola rosea*, thus obtaining a somewhat different drink composition. In both cases, the result is a drink composition to be diluted in ratio of 1:10 for use. Preferable volume of one ready-to-drink portion is 500 ml. The portion may also have a different volume, in which case said preferable concentrations of the active agents are adjusted accordingly. In the Table below, approximate concentrations of various agents in said composition are presented.

| Ingredients: | Concentrate 1 kg (to be diluted 1:10) g | Portion 500 ml (ready drink) Portion mg/500 ml | Contents, in 100 g of the drink % by weight |
|---|---|---|---|
| Water I | 435.27 | 21763.5 | 4.35 |
| Water II | 80.00 | 4000 | 0.80 |
| Fructose | 296.00 | 14800 | 2.96 |
| Glucose | 74.00 | 3700 | 0.74 |
| Apple concentrate, 70% | 40.00 | 2000 | 0.40 |
| Lemon concentrate Bx 67.65 | 2.5 | 125 | 0.025 |
| Lignon concentrate 65% | 15.00 | 750 | 0.15 |
| Guarana extract | 7.00 | 350 | 0.07 |
| Taurin | 5.00 | 250 | 0.05 |
| Pycnogenol ® | 0.50 | 25 | 0.005 |
| Caffeine | 0.13 | 6.5 | 0.0013 |
| Green tea extract 4:1 | 1.00 | 50 | 0.01 |
| L-carnitine UPS 100% | 10.00 | 500 | 0.10 |
| Inositol | 0.30 | 15 | 0.002 |
| Trimagnesium dicitrate | 25.80 | 1290 | 0.258 |
| KCl (K 52%) | 4.0 | 200 | 0.04 |
| NaCl (Na 39%) | 2.0 | 100 | 0.02 |
| Sodium benzoate | 0.50 | 25 | 0.005 |
| Potassium sorbate | 1.00 | 50 | 0.01 |
| Ginkgomax tincture | 10.00 ml | 0.5 ml | 0.10 (apprx.) |
| Relaxor tincture | 4.0 ml | 0.20 ml | 0.04 (apprx.) |
| Avenamax tincture | 5.0 ml | 0.25 ml | 0.05 (apprx.) |
| Dynaforce | 10.0 ml | 0.5 ml | 0.10 (apprx.) |

The guarana extract of the Example was supplied by the company Satco (Guarana dry extract), green tea extract (Temple of Heaven) was supplied by the company Scandilink, pycnogenol preparation was supplied by the company Horphag, and the L-carnitine used is 100% USP L-carnitine produced by the company Lonza.

The drink composition presented above is only illustrative, the concentrations of the active agents varying for instance according to the intended use. For instance, in the ready drink, the concentration of fructose may be in the range from 0.5 to 20% by weight, preferably from 2 to 4% by weight. The concentration of glucose may vary from 0.125 to 5% by weight, preferably from 0.5 to 1.0% by weight. The concentration of guarana extract may vary from 0.02 to 0.7% by weight, preferably from 0.05 to 0.1% by weight. The concentration of taurin may vary from 0.02 to 0.5% by weight, preferably from 0.04 to 0.06% by weight. The concentration of the pycnogenol extract may vary from 0.001 to 0.1% by weight, preferably from 0.04 to 0.01% by weight. The concentration of the green tea extract may vary from 0.001 to 0.1% by weight, preferably from 0.005 to 0.015% by weight. The concentration of L-carnitine may vary from 0.02 to 0.5% by weight, preferably from 0.05 to 0.15% by weight. The concentration of potassium may vary from 0.01 to 0.5% by weight, preferably from 0.015 to 0.05% by weight. The concentration of sodium may vary from 0.005 to 0.05% by weight, preferably from 0.006 to 0.01% by weight. The concentration of magnesium may vary from 0.02 to 0.2% by weight, preferably from 0.03 to 0.05% by weight (trimagnesium citrate contains 15.5% of magnesium).

The mixture may be sterilized for instance by heating, or sterile filtration. Other sterilization methods known to those skilled in the art may also be used.

Some embodiments of the invention are described above. The invention is not limited by the solutions presented above. The drink composition of the invention may of course be also utilized during other activities that sport. For instance, uniform performance is also needed during car driving, studying and light professional work demanding concentration. The inventive idea may be used in various applications within the scope of the appended claims.

The invention claimed is:

1. A drink composition that improves muscle and mind function, acts as a relaxant, and counterbalances the effects of adrenaline, comprising glucose, fructose, guarana, taurine, and at least one extract comprising flavonoids in physiologically active amounts selected from the group consisting of conifer bark extract and grapeseed extract.

2. The drink composition of claim 1, wherein said conifer bark extract comprises pycnogenols.

3. The drink composition of claim 1, wherein the ratio of fructose to glucose is about 2:1-6:1.

4. The drink composition according to claim 3, wherein the ratio of fructose to glucose is about 4:1.

5. The drink composition according claim 1, wherein it further comprises chromium, magnesium, potassium, or combinations thereof in physiologically active amounts.

6. The drink composition of claim 1, further comprising green tea extract in a physiologically active amount.

7. The drink composition of claim 1, further comprising 0.5-20% fructose, 0.125-5% glucose, 0.02-0.7% guarana extract, 0.02-0.5% taurine, and 0.001-0.1% pycnogenol, measured by weight of the drink.

8. The drink composition according to claim 1, wherein it further comprises L-carnitine in a physiologically active amount.

9. The drink composition of claim 1, further comprising 0.001-0.1% by weight of green tea extract.

10. The drink composition of claim 1, wherein it further contains about 0.02-0.2% by weight of magnesium, or 0.01-0.5% by weight of potassium, or both.

11. The drink composition of claim 1, wherein it further contains about 0.02-0.5% by weight of L-carnitine.

12. The drink composition of claim 1, wherein it further contains physiologically active amounts of one or more of the following substances selected from the group consisting of carbohydrates, salts, caffeine, flavonoids, isoflavonoids, formononetin; lignans, betaine, methylsulphonyl methane (MSM); minerals, trace elements; proteins, peptides, carnosine; amino acids, tryptophan; mucopolysaccharides, chondroitin sulphate; glycosaminoglycans, *curcuma*, alpha-lipoic acid, antibodies, colostrum preparations, probiotics, prebiotics; herbs *Ginkgo biloba, Passiflora incarnata, Carduus marianum*, hop, oat seedlings, lemon balm; essential oils, anise essential oil, nutmeg essential oil, cinnamon essential oil; adaptogenic plant extracts, *Rhodiola rosea* extract, ginseng extract, *Acanthopanax senticosus* extract, *Leuzea carthamoides* extract; vitamins, vitamin C, and vitamins of the B-group, lipophilic vitamins, ubiquinone, inositol; choline, carotenoids, garlic preparation, secoiridoid, soluble fiber, fatty acid, conjugated linoleic acid, and phospholipid.

13. The drink composition of claim 1, wherein the drink composition is in the form of a dry substance miscible with liquids.

14. The drink composition according to claim 13, wherein the form of a dry substance miscible with liquids is selected from the group consisting of powder, granule and effervescent tablet.

15. The drink composition according to claim 1, wherein the liquid base of the drink is a liquid of plant origin, a lingonberry based liquid, apple based liquid, aronia based liquid, sallow thorn based liquid, or cranberry based liquid.

16. The drink composition of claim 1, wherein said conifer bark extract comprises pine bark extract.

* * * * *